Patented Feb. 22, 1944

2,342,113

UNITED STATES PATENT OFFICE 2,342,113

COMPOSITION OF MATTER, METHOD OF MAKING SAME, AND IMPROVED LUBRICATING OIL

Charles M. Blair, Jr., Webster Groves, Mo., assignor to Petrolite Corporation, Ltd., Wilmington, Del., a corporation of Delaware No Drawing. Application October 6, 1942, Serial No. 461,035

10 Claims. (252—56)

The present invention relates to a new class of chemical substances and more particularly to new reagents which are useful as additives for lubricating oil.

Briefly, this new class of chemical compounds may be described as consisting of esters derived by an esterification reaction between a high molecular weight alcohol and a polybasic carboxy acid or anhydride of the kind hereinafter described.

Thus, one particular feature of the present invention relates to a new and useful composition of matter. Said composition involves a mixture of a hydrocarbon oil and more particularly, a viscous hydrocarbon oil such as a lubricating oil and a comparatively small amount of the chemical substances previously mentioned. Such mixture of improved lubricating oil, even though it contains a relatively small proportion of the aforementioned additives, is characterized by the fact that its pour point or flow point is markedly lower than the pour point or flow point of the same lubricating stock in the absence of such additive. Such additive may have other desirable properties, such as increasing resistance to discoloration, gumming, stability to heat or oxides, corrosivity, etc.

The alcohols contemplated as reactants in preparing the present compounds are the high molecular weight alkyl, aralkyl, and alkyl alicyclic alcohols in which there is present at least one alkyl residue containing at least eight and not more than 32 carbon atoms.

The polybasic acids or anhydrides contemplated as reactants for production of this new class of compounds are obtained by the condensation of an alpha-beta ethylenic carboxy acid or anhydride with an unsaturated, non-hydroxylated fatty acid containing from 10 to 24 carbon atoms in its carbon chain. The desired polybasic acid or anhydride reactants may be prepared by two different types of reaction. One type of reaction involves the condensation of an alpha-beta ethylenic acid or anhydride with a conjugated, unsaturated, non-hydroxylated fatty acid. The second type of reaction involves the condensation of an alpha-beta ethylenic acid or anhydride with a non-conjugated, unsaturated, non-hydroxylated fatty acid.

It is well known that maleic anhydride and other alpha-beta ethylenic acids or anhydrides will condense with conjugated, unsaturated fatty acids in accordance with Thiele's theory of 1-4 addition. The fatty acid in this case, of course, must contain at least two carbon-to-carbon double bonds and these must be conjugated. This type of reaction has been thoroughly studied by Diels and coworkers, and is often referred to as the Diels diene synthesis. The products are often called diene synthesis adducts.

Examples of suitable fatty acids which will take part in a Diels condensation include: Geranic acid, elaeostearic acid, 10,12-octadecadienoic acid, tung oil fatty acids, etc. Actually the esters of these acids, such as the triglycerides or the esters of mono-, di-, or other polyhydric alcohols may be employed in this condensation in place of the fatty acid itself. Examples of suitable esters include: methyl-10,12-octadecadienoate, glycoldielaeostearate, oitacica oil, tung oil, dehydrated conjugated castor oil, ethyl dehydrogeranate and the like.

The alpha-beta ethylenic carboxy acids or anhydrides which are suitable for use in the aforementioned Diels diene synthesis for preparation of the present products are those containing less than 10 carbon atoms and are exemplified by crotonic acid, maleic acid, fumaric acid, citraconic acid, glutaconic acid, acyrlic acid, maleic anhydride, and citraconic anhydride.

Polybasic acids or anhydrides contemplated as reactants for production of this new class of compounds are also obtained by the condensation of an alpha-beta ethylenic acid, or anhydride with an unsaturated, non-conjugated, non-hydroxylated fatty acid containing from 10 to 24 carbon atoms in the carbon chain. It has recently been shown by Clocker, U. S. patents, 2,188,882 to 2,188,892 inclusive, and Bickford et al., Oil & Soap, Feb., 1942, page 23 et seq., that such condensations may be brought about by heating the reactants at a suitably elevated temperature, usually above 200° C. and sometimes at temperatures above 300° C. The products formed are also acids or anhydrides, since the reaction appears not to involve the destruction of these groups. The alpha-beta ethylenic acids or anhydrides which are suitable for use in the aforementioned condensation with non-conjugated, unsaturated, non-hydroxylated fatty acids are those containing less than 10 carbon atoms and are exemplified by crotonic acid, maleic acid, fumaric acid, citraconic acid, glutaconic acid, acrylic acid, maleic anhydride, and citraconic anhydride. Reference herein and in the claims to alpha-beta unsaturated acids is intended to include the anhydrides corresponding to such acids. Actually they are recognized as being functionally equivalent in condensations of the kinds herein contemplated.

Suitable non-conjugated, unsaturated, non-hydroxylated fatty acids for use in condensation reactions with the above-mentioned alpha-beta ethylenic acids are those containing from 10 to 24 carbon atoms in their carbon chains, and include undecylenic acid, oleic acid, elaidic acid, linoleic acid, linolenic acid, etc.

Actually, as pointed out by Clocker in the above-mentioned patents, the esters of these acids, such as the triglycerides or the esters of mono- or di- or other polyhydric alcohols may be employed in this condensation in place of the fatty acid itself. In the present specification and in the claims, the term "non-conjugated, unsaturated, non-hydroxylated fatty acids" is intended to include the esters of such acids with mono-, di-, or polyhydric alcohols. For the production of the present compositions using as one reactant the above described condensation compounds of Clocker, I usually prefer to employ a condensation product derived from a glyceride containing, in esterified form, a large proportion of non-conjugated, unsaturated, non-hydroxylated fatty acid. Examples of such glycerides are olive oil, corn oil, cottonseed oil, linseed oil, rapeseed oil, perilla oil, cranberry seed oil, menhaden oil, cod oil, whale oil, heat bodied linseed oil, etc.

When glycerides or other esters of the non-conjugated, unsaturated, non-hydroxylated fatty acids are employed in the condensation reaction, the final product is not necessarily a polybasic acid or anhydride, since a monocarboxy, alpha-beta ethylenic acid, such as crotonic acid, may have been employed in the condensation. However, such monobasic acid condensation products are contemplated as reactants in preparing my new compositions; and they are intended to be included when reference is made to a polybasic carboxy acid or anhydride reactant. Actually they are the partial esters of dibasic acids and under certain conditions may function as polybasic acids by interchange of the alcohol residue with a hydroxyl-containing reactant.

My new compositions may be prepared by an esterification reaction between a diene synthesis adduct or a Clocker adduct and a high molecular weight alcohol. The alcohols contemplated are those containing an alkyl group of from 8 to 32 carbon atoms, but in addition may contain other hydrocarbon groups or residues such as aromatic rings, alicyclic rings or even heterocyclic rings. The hydroxyl group may be attached either to the alkyl residue or to the non-alkyl portion of the molecule, but of course must be capable of forming an ester by reaction with the Clocker adduct. These alcohols may be either straight or branch chains and may be either primary, secondary, or tertiary, but are preferably primary or secondary, as such alcohols generally are more easily reacted with a minimum of side reactions to form the desired esters. Examples of suitable alcohol reactants include the following: n-octyl alcohol, 2-ethyl hexanol, lauryl alcohol, cetyl alcohol, octadecyl alcohol, ceryl alcohol, para-iso-octyl phenol, lauryl alcohol, 7-ethyl-2-methylundecanol-4, 3,9-diethyl tridecanol-6, dodecyl phenol, decylcyclohexanol, alcohols obtained by reduction of naphthenic acids, alcohols obtained by the hydrolysis of halogenated paraffin wax, alcohols obtained by the oxidation of high boiling petroleum fractions, and alcohols obtained by the reduction of synthetic acids resulting from the oxidation of Pennsylvania lubricating oil fractions.

Other suitable alcohols include the olefinic alcohols containing from 8 to 32 carbon atoms and alcohols containing an olefinic residue of from 8 to 32 carbon atoms. The presence of a double bond in the hydrocarbon chain does not appear to alter the usefulness or effectiveness of the ester products, and for the purposes of the present invention the term "alkyl" as applied in describing suitable alcohols is intended to include olefinic residues which can be considered as being derived from an alkyl residue by dehydrogenation. Suitable olefinic alcohols include oleyl alcohol, undecenyl alcohol, hexadecenyl alcohol, eicosenyl alcohol, cardanol, and the like.

For convenience in describing the reactions involved in preparing the present products, the diene synthesis adducts and the Clocker adducts will be referred to simply as unsaturated fatty acid adducts, and this term is also intended to refer to adducts derived from the esters of the unsaturated fatty acids. In the examples it will be clear whether the adduct reactant employed is of the diene synthesis type or the Clocker type. A mixture of the two may be employed if desired.

In carrying out the synthesis of the present class of compounds, it is usually most convenient to prepare the desired adduct of the unsaturated fatty acid and an alpha-beta ethylenic acid, after which the desired high molecular weight alcohol is added and esterified by heating and stirring. It is not necessary that all of the carboxyls or potential (anhydride) carboxyls of the adduct be esterified with high molecular weight alcohols, and, as will be discussed hereinafter, some carboxyls will often be left unesterified.

The following examples illustrate the preparation of some of the present products:

*Example 1*

A diene synthesis adduct was first prepared by refluxing for 4 hrs. a mixture of 150 g. of tung oil acids, 50 g. of maleic anhydride, 100 g. of benzol, and a small crystal of iodine.

To the above adduct in benzol was added 186 g. of lauryl alcohol and refluxing was continued with a water trap under the condensor. After 2 hrs. refluxing, the benzol and water of reaction were slowly distilled off, leaving a viscous reddish oil. This product had a pour point depressing action on a Mid-Continent lubricating oil.

*Example 2*

Tung oil was substituted for the tung oil acids in Example 1. The product in this case was quite soluble in kerosene and lubricating oil and was superior in pour point depressing properties to the product of Example 1.

*Example 3*

42 g. of crotonic acid were substituted for the 50 g. of maleic anhydride in Example 2, and only 93 g. of lauryl alcohol were employed in the esterification step.

*Example 4*

A Clocker adduct was prepared by heating and stirring under an air condenser a mixture of 300 g. of linseed oil and 200 g. of citraconic anhydride. The temperature of this mixture was slowly raised to 230° C. and held at this point for 2½ hrs.

50 g. of the above adduct was heated and stirred in an open vessel with 50 g. of cetyl alcohol. The temperature was raised to 240° C.

and held for 45 minutes. The final product was a viscous oil, clearly soluble in kerosene and in lubricating oil.

*Example 5*

Maleic anhydride was substituted for the citraconic anhydride of Example 4.

*Example 6*

Methyl linolenate was substituted for the linseed oil of Example 4.

*Example 7*

300 g. of soyabean oil and 100 g. of maleic anhydride were heated with stirring under an air condenser. The temperature was gradually raised to 240° C. and held at this point for 3 hrs.

50 g. of the above adduct and 35 g. of oleyl alcohol were heated and stirred in an open beaker for 1 hr. at a temperature of 250° C. The product was a viscous oil having good pour point depressant action on a Gulf Coast lubricating oil.

*Example 8*

Octylcyclohexanol was substituted for oleyl alcohol in Example 7.

In some of the examples given above, less alcohol has been used in the esterification reaction than corresponds to all of the available carboxyls present in the adduct. Any reacted carboxyl acid or anhydride groups may be left as such or may be neutralized with ammonia, amines, or inorganic bases, in which case the acidic hydrogen of the carboxyl is replaced with an ammonium, amino, or metal ion. Products having detergent and sludge dispersing properties may be prepared, for example, by treating the product of Example 4 with calcium hydroxide, to neutralize free carboxy acid groups, heating to complete the reaction and drive off water, dissolving in ligroin, filtering to remove unused calcium hydroxide, and evaporating ligroin from the filtrate.

Similar products may be prepared from the compounds of the other examples where free anhydride or carboxyl groups are present.

If desired, residual carboxy acid groups may be esterified with low molecular weight alcohols to yield products with improved oil solubility.

Residual carboxy acid groups may be reacted with phenols, for example, phenol, catechol, pyrogallol, etc., to yield products with antioxidant properties. Amino phenols such as para-amino phenol or ortho-amino phenol may be used either to neutralize carboxyls or to esterify or amidify them, thus giving compounds of improved antioxidant properties.

Recapitulating, the acidic hydrogens which may remain in the present class of chemical reagents may be left as such or may be replaced by any equivalent. Such acidic products may be treated with a suitable alkaline material such as caustic soda, caustic potash, ammonium hydroxide, calcium hydroxide, magnesium hydroxide, etc., to form the corresponding metallic salts, or with amines such as amylamine, cyclohexylamine, triethanolamine, para amino phenol, etc., to form the amine salts. The acidic hydrogen may be replaced by a lower alcohol residue derived from alcohols such as ethanol, butanol, hexanol, cyclohexanol, phenol, catechol, etc., to form an ester. Amino alcohols such as the ethanolamines, glyceryl amines, etc., may be employed to replace an acidic hydrogen either by esterification or salt formation.

The present class of chemical products appears to have its greatest usefulness in the field of lubricating oil additives and rust preventers, and are particularly effective pour point depressants for waxy or paraffinic lubricating oils. They are also very effective in modifying the crystalline form of wax crystals and may be employed for this purpose to obtain more easily filterable wax cakes during dewaxing operations. When used as pour point depressants in lubricating oils the present materials are generally effective in proportions varying between 0.01% and 2% based on the weight of oil.

Certain of the present compounds also have detergent and sludge dispersing properties and when used in lubricating oil are effective in preventing sludge and varnish deposition in engines. In general the present products have the property of inhibiting or greatly lessening the corrosion of ferrous metals when applied to such metals directly or in the form of solutions in oils or greases.

Others of these reagents have the property of increasing the oiliness or load-bearing capacity of oils; and still others have antioxidant properties.

It will be obvious to most chemists that various derivatives of the present products may be prepared which will have similar properties. For example, many of the present products contain carbon-to-carbon double bonds, either in the fatty acid or alcohol chain, and may be readily sulfurized by heating with sulfur. Such sulfurized derivatives, in some instances, have valuable properties over and above the original unsulfurized product. For example, they usually are better antioxidants and have greater film strength as lubricants.

Other obvious derivatives include those derivable by oxidation, as by blowing with air or oxygen at elevated temperatures, and polymarized products derivable by reacting carboxyl or anhydride containing composition with polyhydric alcohols or polyamines.

It is to be understood that the new compounds or compositions previously referred to may find various uses as well as lubricating oil additives. For instance, they may be used as rust inhibitors, plasticizers, etc. When used as rust inhibitors, they might be combined with petrolatums or the like, in which pour point depression would be without interest.

However, as previously stated, one particular feature of the present invention is the production of an improved lubricating oil. The present compounds, when used as pour depressors, may be compounded with lubricating oils in proportions ranging from a fraction of a percent. up to several percent., for example, from 0.01% to 1% or somewhat more, to as much as 2%.

Added to a Mid-Continent lubricating oil, originally having a pour point test of zero degrees F., 0.3% based on the oil, of the pour point depressant, exemplified by Example 4 preceding, produced a compounded product having a pour test of —20 degrees F. Such reduction in the pour point test was obtained without impairment of the viscosity index of the oil, and probably with an enhancement of corrosion inhibiting properties.

My present invention includes these compounds of the kind referred to as pour depressors for lubricating oils, and the improved lubricating oils obtained by compounding the two substances with or without other additives.

Having described my invention, I claim:

1. A composition of matter comprising lubricating oil and a relatively small amount of the monohydric alcohol ester of an acidic adduct which is an alpha-beta ethylenic carboxy acid having not over 10 carbon atoms, combined at an intermediate point in the carbon atom chain of a non-hydroxylated unsaturated fatty acid radical having at least 8 and not more than 32 carbon atoms; said alcohol containing at least one alkyl hydrocarbon radical having at least 8 and not more than 32 carbon atoms.

2. A composition of matter comprising lubricating oil and a relatively small amount of the monohydric alcohol ester of an acidic adduct which is a polybasic alpha-beta ethylenic carboxy unsaturated acid having not over 10 carbon atoms, combined at an intermediate point in the carbon atom chain of a non-hydroxylated unsaturated fatty acid radical having at least 8 and not more than 32 carbon atoms; said alcohol containing at least one alkyl hydrocarbon radical having at least 8 and not more than 32 carbon atoms.

3. A composition of matter comprising lubricating oil and a relatively small amount of the monohydric alcohol ester of an acidic adduct which is an alpha-beta ethylenic polycarboxy acid having not over 10 carbon atoms, combined at an intermediate point in the carbon atom chain of a non-hydroxylated polyethylenic fatty acid radical having at least 8 and not more than 32 carbon atoms; said alcohol containing at least one alkyl hydrocarbon radical having at least 8 and not more than 32 carbon atoms.

4. A composition of matter comprising lubricating oil and a relatively small amount of the monohydric alcohol ester of an acidic adduct which is an alpha-beta ethylenic polycarboxy acid having not over 10 carbon atoms, combined at an intermediate point in the carbon atom chain of a non-hydroxylated polyethylenic fatty acid radical having 18 carbon atoms; said alcohol containing at least one alkyl hydrocarbon radical having at least 8 and not more than 32 carbon atoms.

5. A composition of matter comprising lubricating oil and a relatively small amount of the monohydric alcohol ester of an acidic adduct which is an alpha-beta ethylenic polycarboxy acid having not over 10 carbon atoms, combined at an intermediate point in the carbon atom chain of a non-hydroxylated, polyethylenic, vegetable fatty acid radical having 18 carbon atoms; said alcohol containing at least one alkyl hydrocarbon radical having at least 8 and not more than 32 carbon atoms.

6. A composition of matter comprising lubricating oil and a relatively small amount of the monohydric aliphatic alcohol ester of an acidic adduct which is an alpha-beta ethylenic polycarboxy acid having not over 10 carbon atoms, combined at an intermediate point in the carbon atom chain of a non-hydroxylated polyethylenic vegetable fatty acid radical having 18 carbon atoms; said alcohol containing at least one alkyl hydrocarbon radical having at least 8 and not more than 32 atoms.

7. A composition of matter comprising lubricating oil and a relatively small amount of the monohydric aliphatic alcohol ester of an acidic adduct which is an alpha-beta ethylenic polycarboxy acid having not over 10 carbon atoms, combined at an intermediate point in the carbon atom chain of a polyethylenic vegetable fatty acid radical having 18 carbon atoms; said alcohol containing at least one alkyl hydrocarbon radical having at least 8 and not more than 32 carbon atoms; at least one long carbon atom chain being attached to the same carbon atom to which the hydroxyl group is attached.

8. A composition of matter comprising lubricating oil and a relatively small amount of the lauryl alcohol ester of an acidic adduct which is an alpha-beta ethylenic polycarboxy acid having not over 10 carbon atoms, combined at an intermediate point in the carbon atom chain of a non-hydroxylated polyethylenic vegetable fatty acid radical having 18 carbon atoms; said alcohol containing at least one alkyl hydrocarbon radical having at least 8 and not more than 32 carbon atoms; at least one long carbon atom chain being attached to the same carbon atom to which the hydroxyl group is attached.

9. A composition of matter comprising lubricating oil and a relatively small amount of the octadecyl alcohol ester of an acidic adduct which is an alpha-beta ethylenic polycarboxy acid having not over 10 carbon atoms, combined at an intermediate point in the carbon atom chain of a non-hydroxylated polyethylenic vegetable fatty acid radical having 18 carbon atoms; said alcohol containing at least one alkyl hydrocarbon radical having at least 8 and not more than 32 carbon atoms; at least one long carbon atom chain being attached to the same carbon atom to which the hydroxyl group is attached.

10. A composition of matter comprising lubricating oil and a relatively small amount of the oleyl alcohol ester of an acidic adduct which is an alpha-beta ethylenic polycarboxy acid having not over 10 carbon atoms, combined at an intermediate point in the carbon atom chain of a non-hydroxylated polyethylenic vegetable fatty acid radical having 18 carbon atoms; said alcohol containing at least one alkyl hydrocarbon radical having at least 8 and not more than 32 carbon atoms; at least one long carbon atom chain being attached to the same carbon atom to which the hydroxyl group is attached.

CHARLES M. BLAIR, Jr.